United States Patent
Swonk et al.

(10) Patent No.: US 7,016,361 B2
(45) Date of Patent: Mar. 21, 2006

(54) VIRTUAL SWITCH IN A WIDE AREA NETWORK

(75) Inventors: Glenn L. Swonk, Laguna Niguel, CA (US); Andrew John Marston, Manhattan Beach, CA (US); Andrew McCloskey, Yorba Linda, CA (US)

(73) Assignee: Toshiba America Information Systems, Inc., Irvine, CA (US)

( * ) Notice: Subject to any disclaimer, the term of this patent is extended or adjusted under 35 U.S.C. 154(b) by 964 days.

(21) Appl. No.: 10/087,868

(22) Filed: Mar. 2, 2002

(65) Prior Publication Data

US 2003/0165138 A1    Sep. 4, 2003

(51) Int. Cl.
*H04L 12/28* (2006.01)
*H04Q 7/24* (2006.01)

(52) U.S. Cl. .................. 370/401; 370/392; 370/338
(58) Field of Classification Search ................ None
See application file for complete search history.

(56) References Cited

U.S. PATENT DOCUMENTS

| | | | |
|---|---|---|---|
| 5,969,678 A | 10/1999 | Stewart | |
| 6,130,892 A | 10/2000 | Short et al. | |
| 6,194,992 B1 | 2/2001 | Short et al. | |
| 6,259,405 B1 | 7/2001 | Stewart et al. | |
| 6,326,918 B1 | 12/2001 | Stewart | |
| 6,759,960 B1 * | 7/2004 | Stewart | 340/573.1 |
| 2002/0181476 A1 * | 12/2002 | Badamo et al. | 370/401 |
| 2003/0051041 A1 * | 3/2003 | Kalavade et al. | 709/229 |
| 2004/0005878 A1 * | 1/2004 | Olin et al. | 455/414.1 |
| 2004/0214572 A1 * | 10/2004 | Thompson et al. | 455/435.2 |

OTHER PUBLICATIONS

Cisco Systems, White Paper, Cisco Building Broadband Service Manager, Technical Overview, 1992-2001, pp. 1-10.
Cisco Systems, Data Sheet, Cisco Building Broadband Service Manager, Version 5.1, 1992-2001, pp. 1-7.

* cited by examiner

*Primary Examiner*—Duc Ho
(74) *Attorney, Agent, or Firm*—PIllsbury Winthrop Shaw Pittman LLP

(57) ABSTRACT

Embodiments of the invention are directed to a system and an apparatus for enabling a user device or a plurality of user devices to communicate with a gateway service device. The system may include at least one user device, at least one remote access device, a communication network, a central access device, and the gateway service device. The system operates such as if the gateway service device and the user device are on the same network. The data may be transmitted from the user device to the at least one remote access device where it is encapsulated to allow the data to be routed over the communication network. The central access device may receive the data and de-encapsulate the data in order to transfer the data to the gateway service device.

106 Claims, 3 Drawing Sheets

VIRTUAL SWITCH IN A WIDE AREA NETWORK

BACKGROUND OF THE INVENTION

With the increasing popularity of portable data communication devices, the demand for access to data communication networks from remote locations has exploded. Much focus has been placed on network access in public areas, such as airports, hotels, shopping centers, coffee shops, bookstores, and juice bars where many people gather for a significant length of time. Connections to the Internet or other communication networks in public areas normally require the utilization of a telephone line or physical network connections, such as a RJ-45 network connection. The advent of wireless communications to some extent has freed users with user devices from their previous dependence on such telephone or physical network connections in order to connect to the Internet or corporate networks. In order to establish wireless communications, however, the user device may need to be in close proximity to a wireless access point due to the current limited geographical reach of wireless communications infrastructure and communication frequency bandwidth limitations.

A gateway service device can be used to assist in the connection of multiple user devices to the Internet. The gateway service device is placed in a public location, such as a hotel lobby, airport, coffee shop, bookstore, or convention center. The gateway service device aggregates the inputs of the user devices and provides a uniform access point to the Internet or other communication networks for the plurality of user devices. The gateway service device provides broadband access to the Internet or other communication networks via a high-speed T1 transmission line.

Gateway service devices are typically implemented by installing gateway service device software on a computing device, such as a TOSHIBA Magnia server. Gateway service device software may allow service providers to deploy, market, and operate broadband services to individuals who are geographically located within the service providers' area. The gateway service device software may provide one or more the following services: plug-and-play access, authentication, end-user self-provisioning, billing, tiered services, and Web-based reporting. Illustratively, Cisco Building Broadband Service Manager (BBSM) software by Cisco Systems, Inc. of San Jose, Calif. may be installed on a computing device to provide a gateway service device with the above-mentioned functionality.

Gateway service device software generally is prohibitively expensive to justify use in smaller public areas, e.g., coffee shops, and bookstores. Furthermore, the cost of a T1 transmission line is approximately $ 600 per month. Owners of large publicly-accessible areas, such as apartment buildings, hotels, office buildings, and campuses may incur these costs and be able to recoup the costs by increased rents, connection charges, etc. However, small businesses like doctor's offices, dentist's offices, coffee shops, copy centers, juice bars, auto dealerships, etc., that offer customer public areas cannot justify the minimum initial outlay for the gateway service device software and the recurring costs associated with the operation of a gateway service device, and thus may not be able to provide broadband Internet access for visitors to their establishments based on current configurations of the gateway service device.

Accordingly, a need exists for the owners of small enterprise public gathering places, such as bookstores and coffee shops, to be able to pool together resources to provide reliable, high-speed Internet access for their customers and be able to charge store patrons individually.

DETAILED DESCRIPTION OF THE INVENTION

Figure 1:
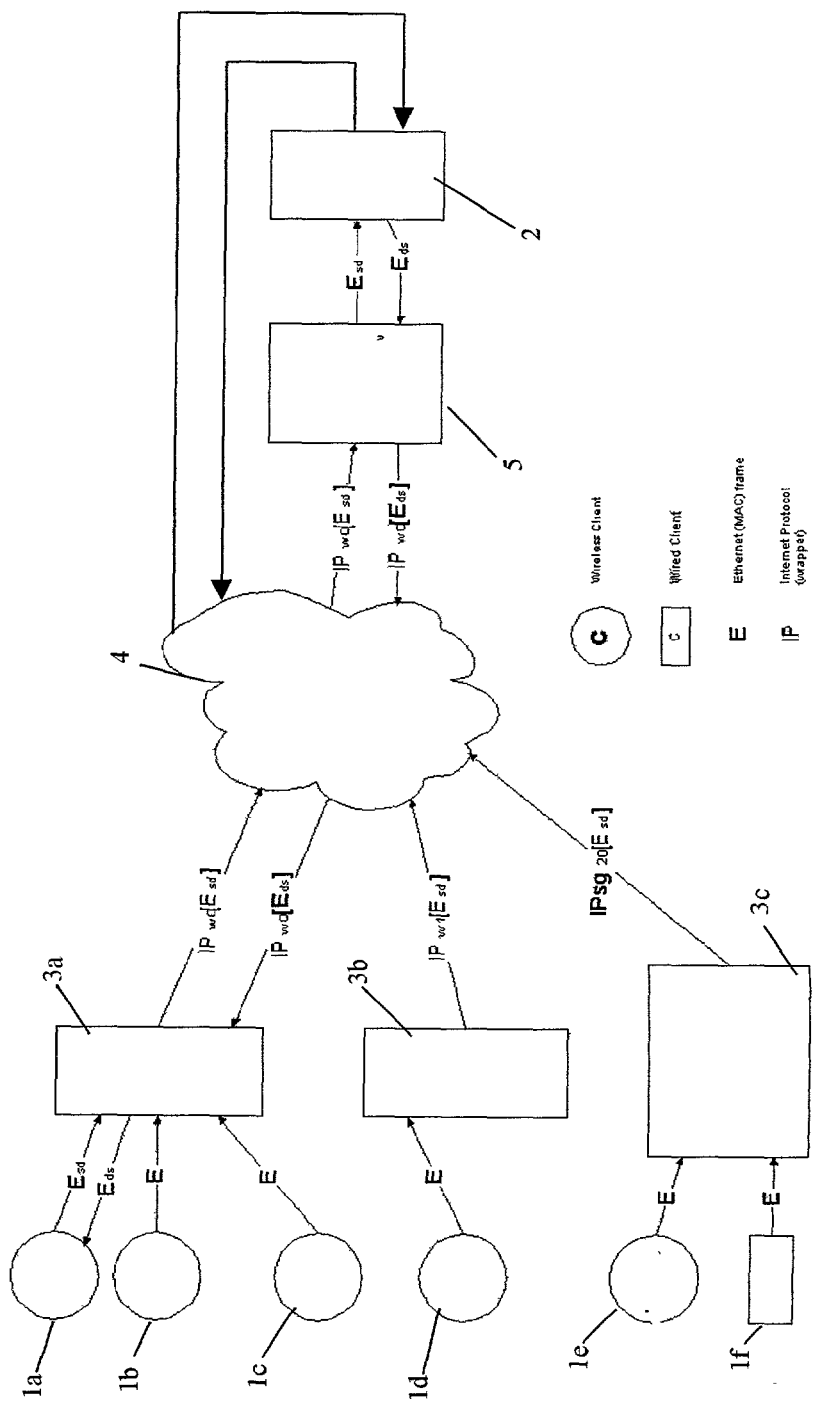
FIG. 1 illustrates a distributed virtual local area network according to an embodiment of the present invention.

FIG. 1 illustrates a distributed virtual local area network according to an embodiment of the present invention. In an embodiment of the present invention, a distributed virtual local area network (LAN) may provide centralized tracking information and gateway services for multiple user devices on the distributed virtual LAN by incorporating a gateway service device 2. The distributed virtual LAN may include a plurality of user devices 1a–1f, a plurality of remote access devices (RADs) 3a–3c, a communication network 4, a central access device (CAD) 5, and a gateway service device 2.

User devices may include personal digital assistants, laptop computers, network computers, wireless personal computing devices, or the like. User devices 1a–1f may communicate with a RAD 3a–3c via any one of a number of communication methods. In embodiments involving fixed-line user devices, a user device 1a–1f may generally communicate with a RAD 3a–3c to which it is electrically coupled, either directly or indirectly through a LAN. For example, a laptop computer may be configured to connect to a first remote access device (RAD) via an Ethernet cable. In embodiments involving wireless user devices, the user device 1a–1f may generally communicate with a RAD 3a–3c in its geographic area. In such embodiments, the user devices 1a–1f may be a personal wireless communication device and may be configured to communicate with a remote access device 3a–3c utilizing a wireless communications protocol, such as Bluetooth, HomeRF, and IEEE 802.11b, or the like. A single RAD 3a–3c may accommodate different types of user devices 1a–1f according to different communication protocols. Alternatively, a RAD 3a–3c may be dedicated for communication with a particular type of user device 1a–1f or communication according to a certain protocol and multiple RADs 3a–3c may be located in a single public area.

For example, a RAD 3a–3c may be installed in conjunction with a pay telephone. A pay telephone may have one physical connection wire with two logical connections, one for audio connections, e.g., Plain Old Telephone Service (POTS) and one for digital subscriber line (DSL) service. The RAD 3a–3c is "piggybacking" onto the one connection wire and utilizing the upper frequency bandwidth of the telephone line in order to enable communications to an ISP. The only modification that may need to be made is at the switching office of a telephone company, where the equipment may need to be updated to receive communications via DSL. The RAD 3a–3c may be installed on the payphone and receive information via wireless communications from a user device 1a–1f. The RADs 3a–3c may then transmit the information from the user device over the DSL portion of the telephone line in order to establish communication with the communication network 4. A user may be using the audio portion of the telephone line and may not know a RAD 3a–3c is receiving wireless communications from a user device 1a–1f. Similarly, the user devices 1a–1f may not know that the RAD 3a–3c they are interfacing with is attached to a payphone. This embodiment is cost effective because the payphone operator has already gone through the expense of installing the telephone line and most phone switching offices have been updated to receive DSL communications.

A data message may be the original message transmitted by a user device 1a–1f Generally, the header added to a packetized data message may be a LAN frame or LAN header. In specific circumstances, the header may be referred to as a MAC-address frame. Also, the entire packet (including the data message and LAN frame) may be referred to as a LAN-switchable packet. In specific circumstances, the entire packet (data message and LAN-frame) may be referred to as the MAC packet.

Generally, the header added to the packetized data message plus the LAN header to allow transport over the communication network 4 may be a network-routing frame or network-routing header. In specific circumstances, the network-routing header may be referred to as an IP header. Also, the packet able to be routed over the communication network 4 (data message, LAN header, network routing header) may be referred to as a network-routable packet. In specific circumstances, the network-routable packet may be referred to as an IP packet. The network address in the IP packet may be a public network address.

In addition, a private network address may be included in the data message of the LAN-switchable packet. For example, if a user device 1a–1f is attempting to communicate with a specific server on the communication network 4, the user device 1a–1f may include its private network address in the data packet of the LAN-switchable packet. The user device 1a–1f may be assigned a private network address as discussed in further detail, hereinafter.

In an embodiment of the invention, each RAD 3a–3c may correspond to a geographic location, e.g., a coffee shop. A customer's user device 1a–1f may access the communication network through a first RAD 3a when the customer is at a first location corresponding thereto and may access the communication network 4 through a second RAD 3b when the customer is at a second geographic location.

A user device 1a–1f may send a data message to a RAD 3a–3c. The data message may include a payload as well as a LAN frame or LAN header including the physical address of the user device 1a–1f sender, such as a media access control (MAC) address, or such as, a corresponding logical address. The LAN frame or LAN header may also include the physical or logical address of the intended recipient. The ultimate intended recipient may be the gateway service device 2. The RAD 3a–3c may receive packets addressed to the gateway service device 2 because it is the first step in the path to the gateway service device 2. The user device 1a–1f may know the LAN address of the gateway service device 2 because the RAD 3a–3c may periodically provide this information to the user devices 1a–1f The RAD 3a–3c may encapsulate the data message in a network-routing frame or network-routing header identifying the RAD 3a–3c as the sending device and the CAD 5 as the intended recipient. The encapsulated data message may be transmitted to the CAD 5 via the communication network 4. Upon arriving at the CAD 5, the data message may be unencapsulated by removing the network-routing header and the data message may be transmitted to the gateway service device 2.

In embodiments of the present invention, the user device addresses in the LAN frame 1a–1f may be unique, such as, the MAC addresses associated with a network interface card (NIC) within the user device 1a–1f. Alternatively, in other embodiments of the invention, the user device addresses may be statically or dynamically assigned.

In embodiments of the invention, the plurality of user devices 1a–1f and the plurality of RADs 3a–3c are all located on the same distributed local area network with the CAD 5 and the gateway service device 2. Communications between any one of the plurality of user devices 1a–1f and any one of the RADs 3a–3c may use a protocol involving MAC-layer addressing. For example, the user devices 1a–1f and RADs 3a–3c may communicate according to an Ethernet protocol. In embodiments of the invention, the central access device (CAD) 5 and the gateway service device 2 may communicate with each other according to the same protocol as is used for communication between the user devices 1a–1f and the RADs 3a–3c. In some embodiments of the invention, some of the user devices 1a–1f may communicate to the RADs 3a–3c according to different protocols from each other.

In embodiments of the invention utilizing the MAC-address as the LAN address, the MAC address frames may include a destination MAC address (corresponding to the intended recipient, e.g., the gateway service device 2), a source MAC address (corresponding to the user device), and a frame check sequence. The payload, i.e., the data message being transmitted for processing by the intended recipient, may also be transmitted with the MAC address frame. The leading bits of the source MAC address may indicate whether it is an individual address or a group address (e.g., for a broadcast message). For example, the destination MAC address may be the MAC address of the gateway service device 2 because the gateway service device 2 enables each user device 1a–1f to access the communication network 4. The frame check sequence may consist of four bytes and may be a cyclic redundancy check value for verifying that the transmission was not error-prone.

The RAD 3a–3c may receive the LAN-switchable packet from a user device 1a–1f in its geographic area and may encapsulate the payload data and LAN frame, i.e. "data message," in a network-routable packet that contains address information and control information that enables the encapsulated network-routable packet to be routed over the communication network 4, e.g., the Internet. The remote access device 3a–3c may encapsulate LAN-switchable packet by adding a network-routing header to the LAN-switchable packet. The network-routing header may include protocol information, a source network address, and a destination network address. The destination network address may be used by the routers in the communication network 4 to determine the path by which to transmit the packet through the communication network 4 based on the routers' routing tables. The source network address may be a public network address of the RAD 3a–3c.

In embodiments of the present invention, the destination network address may be the network address of the central access device 5 (CAD). In one embodiment of the present invention, each RAD 3a–3c may be configured to know the network address of the CAD 5 before installation of the distributed virtual LAN or before addition of the RAD 3a–3c to the distributed virtual LAN. In another embodiment of the present invention, a self-provisioning mechanism may provide the network address of the central access device to the plurality of RADs 3a–3c. In the latter embodiments, the self-provisioning mechanism may also provide CAD 5 network address information to any new RAD 3a–3c installed on the distributed virtual local area network after the initial setup of the distributed virtual local area network took place. Embodiments of the invention may also combine pre-installation configuration and self-provisioning mechanisms.

In embodiments of the invention, in order to communicate with the communication network 4, the plurality of RADs 3a–3c may each be provided with a public, e.g., routable, network address, such as an Internet Protocol (IP) address. In such embodiments, each remote access device 3a–3c may be provided with a public network address by an Internet Service Provider (ISP) utilizing the Dynamic Host Configuration Parameter (DHCP) protocol. In order to aid in the routing of the packet through the communication network 4, the network-routable packet, i.e., the encapsulated LAN-switchable packet) also may include a transport-layer protocol, such as transmission control protocol (TCP), user datagram protocol (UDP), or the like. For example, UDP is a connectionless transport-layer protocol that is an interface between the network-layer protocol and an upper-layer protocol. UDP adds no reliability, flow-control, or error-recovery functions to the network-layer protocol. UDP also adds a header to the packet, which is the UDP header. The UDP header includes a source port, a destination port, the length of the packet, and a checksum. The source port in the UDP header may be the port to which the RAD 3a–3c provides the network-routable packets to the communication network 4. The destination port in the UDP header may be the port to which the CAD 5 receives the network routable packets from the communication network 4.

The CAD 5 receives the network-routable packets from the communication network 4, that was transmitted from the plurality of remote access devices 3a–3c. The CAD may extract a network-routing header from the network-routable packet and may output the LAN-switchable packets, e.g., the LAN frame or LAN header and the data message, onto a local area network.

Figure 2:
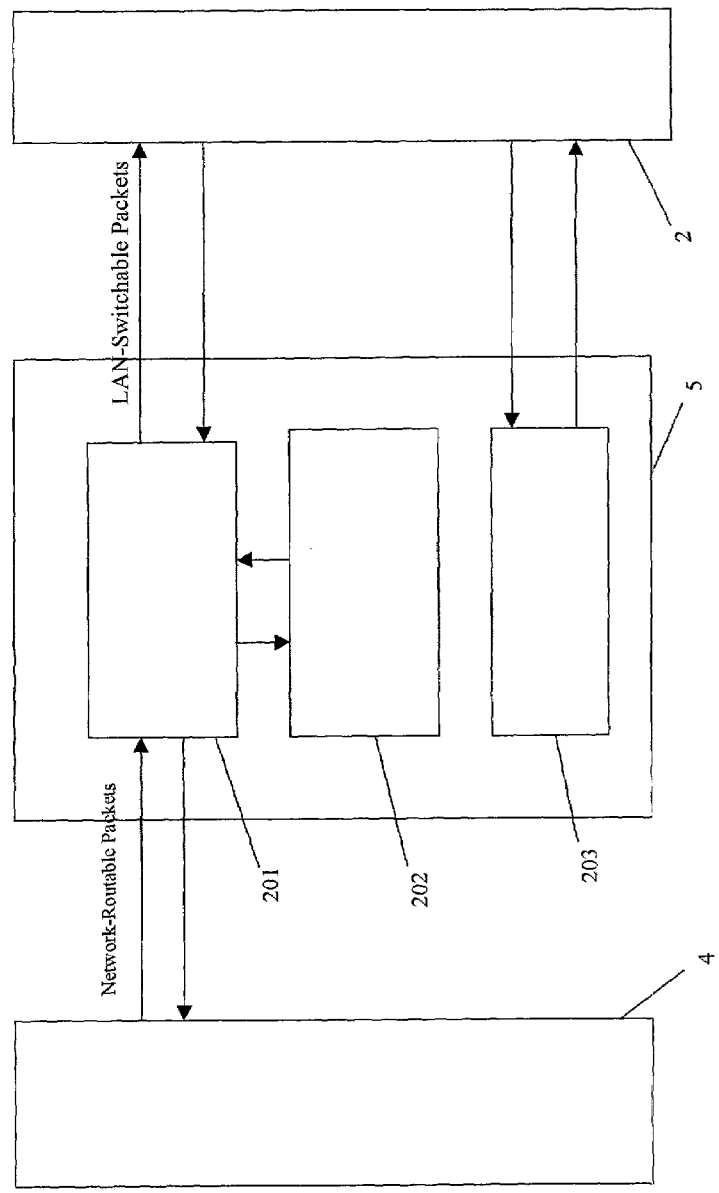
FIG. 2 illustrates a block diagram of a central access device according to an embodiment of the present invention.

FIG. 2 illustrates a central access device according to an embodiment of the present invention. In embodiments of the invention, the CAD 5 aggregates the inputs from the plurality of remote access devices 3a–3c to make it appear that the plurality of RADs 3a–3c and the user devices 1a–1f, which communicate with the gateway service device 2 through the RADs 3a–3c, are physically located on the same local area network. The CAD 5 may include a forwarding module 201, a lookup table module 202, and a logical port emulation module 203, which may all be implemented in software. The CAD 5 may enable many enterprises to share one gateway service device 2, yet still bill their customers, (i.e., users of user devices 1a–1f) separately. In embodiments of the invention, the customers may be owners of user devices 1a–1f In alternative embodiments of the invention where a small building owner might have three tenants utilizing this service, the customer may be the small building owner, who may then bill the tenants separately.

The forwarding module 201 may receive the network-routable packets from the communication network 4 that originated as one of the user device's 1a–1f data messages and passed through a corresponding one of the remote access devices 3a–3c, where it was encapsulated into a network-routable packet. The forwarding module 201 may unecapsulate the encapsulated data message, e.g., by removing the network-routing headers from the network-routable packets, leaving LAN-switchable packets. This may be the case in embodiments in which the gateway service device 2 handles LAN-switchable packets. The forwarding module 201 may output the unencapsulated data message, in the form of LAN-switchable packets, to the gateway service device 2. The LAN-switchable packets output to the gateway service device 2 may be identical to the LAN-switchable packets received by the plurality of remote access devices 3a–3c from the plurality of user devices 1a–1f.

As the network-routable packets are received by the forwarding module 201, the lookup table module 202 may create or update a memory. The lookup table module 202 may extract a RAD network address from the network routing frame of the network-routable packets. Once the forwarding module 201 unencapsulates the network-routable packets, the lookup table module 202 may also extract a user device LAN address from the LAN header of LAN-switchable packets. In embodiments of the invention, the LAN address may be the MAC address. The lookup table module 202 may then store the RAD network address and the corresponding user device LAN address in the memory.

The gateway service device 2 may query the central access device 5 for information regarding a port that one of the plurality of user devices 1a–1f resides on. The gateway service device 2 queries the central access device 5 because it believes all of the plurality of user devices 1a–1f are local (i.e., connected to the CAD 5 on the same local area network to which it is connected). A logical port emulation module 203 may receive these queries from the gateway service device 2 and may provide the gateway service device 2 with the port information by virtually indicating that certain user devices are connected to specific ports of the central access device 5. A management information base, located within the CAD 5, provides the details of how the logical port emulation module 203 may communicate back to the gateway service device 2. The logical port emulation module 203 may transmit the logical port information to the gateway service device 2 for the user devices 1a–1f the gateway service device 2 queried about by following instructions from the management information base. The virtual port assignments may be fixed the entire session of each user device.

The gateway service device 2 may use a network management protocol, e.g., Simple Network Management Protocol) to query the CAD port emulation module 203 to detect the access port to which the user device 1a–1f is connected. Because the user device 1a–1f is not physically connected to a specific port on the CAD 5, the port emulation module 203 provides information to the gateway service device 2 that virtually indicates the user device 1a–1f is connected to a specific port and that user device 1a–1f connected to a specific RAD 3a–3c. Because the gateway service device 2 may set specific policies for each logical port, the gateway service device 2 may provide the traffic through a specified port with the agreed upon policies.

For example, a user device 1a–1f may connect to a RAD 3a–3c in a coffee shop, which transfers the data message over the communication network 4 to the CAD 5. The gateway service device may receive the data message from the CAD 5 and may query the CAD 5 for the port on which the information from the coffee shop RAD 3a–3c entered. The CAD 5 logical port emulation module 203 may provide the logical port information to the gateway service device 2 identifying that the data message came from the coffee shop RAD 3a–3c. Because the coffee shop RAD 3a–3c has specific policies established for any user devices 1a–1f that the RAD 3a–3c may receive communication from, the gateway service device 2 may apply these policies to all data messages incoming from the coffee shop RAD 3a–3c. These policies may include a starting web page for all user devices 1a–1f connecting at the coffee shop RAD 3a–3c. This site mapping allows the gateway service device to serve up custom web pages for each site and/or RAD 3a–3c location. In other words, multiple user devices 1a–1f, communicating from the same RAD 3a–3c, may always be mapped to the same logical port, e.g., site. In addition, a plurality of RADs 3a–3c may also be mapped to a single logical port if the plurality of RADs 3a–3c have the same owner and desire the same customization. For example, the plurality of RADs 3a–3c may all be located in a certain chain of coffee shops which desires to have a uniform interface for user devices 1a–1f attempting to access the communication network 4 through the RADs 3a–3c installed in their coffee shops.

The policies may also include the establishment of a timeout parameter, which sets the time of inactivity before the gateway service device 2 closes the connection to the communication network 4 for the logical port. The CAD 5 may associate a time of a last received data message from each of the user devices 1a–1f utilizing the RADs 3a–3c to which the CAD 5 has been connected. The CAD 5 and the gateway service device 2 correlate the information from the CAD 5, (e.g, the time of the last received data message at the CAD 5 for the LAN address or user device 1a–1f), with the established port policy for timeout assigned by the gateway service device 2, (e.g., the time allowed before automatic disconnection for the logical port the user device 1a–1f has been assigned to), and terminate the connection for the user device 1a–1f. Alternatively, the gateway service device 2 may note that no data messages have been received from a certain logical port to which the gateway service device 2 believes a user device 1a–1f is connected. The gateway service device 2 may interrogate the CAD 5 to determine the last time the CAD 5 has received a data message on the logical port the gateway service device 2 is interested in. The CAD 5 may respond that no data messages have been received in a timeframe that is longer than the timeout policy the gateway service device 2 has assigned to the logical port and the gateway service device 2 may terminate the session with the user device 1a–1f.

The gateway service device 2, which is located on the local area network with the CAD 5, may receive the LAN-switchable packets, e.g., LAN header and data message, from the central access device 5. The gateway service device 2 may utilize the LAN-switchable packets to collect tracking information and to provide control information for the CAD 5, the plurality of remote access devices 3a–3c, and the plurality of user devices 1a–1f on the distributed virtual LAN. The gateway service provider 2 may initiate network address translation (NAT) for the LAN-switchable packets, which may exchange the private network address of the LAN-switchable packets with a public network address which has been assigned to the gateway service device 2 or some variation thereof (e.g., a combination of a public network address assigned to the gateway service device 2 and a logical port provided by the logical port emulation module of the central access device 5). Thus, all the user devices 1a–1f appear to the communication network 4 to be originating from the gateway service device 2. Because the network address translation does not modify the contents of the LAN-switchable packets except to exchange the private subnet network address with a public address, the LAN addresses of the user device 1a–1f may still be contained in the LAN-switchable packets. This allows the gateway service device 2 to identify the user device 1a–1f initiating the communication. After the network address translation is complete, the gateway service device 2 may output network-routable packets to the communication network 4 to enable the user device 1a–1f to access the communication network 4.

In embodiments of the present invention, the gateway service device 2 may be located on a dedicated server. Alternatively, the gateway service device 2 may be located on any server installed on the local area network with the CAD 5, including the CAD 5 itself. In embodiments of the invention, the gateway service device 2 may not modify the contents of LAN-switchable packet except for exchanging the private network address with the public network address during network address translation. A web server may also be installed on the gateway service device. The gateway service device 2 may transfer the LAN-switchable packets to the ultimate destination, which may be the communication network 4, e.g., the Internet, after providing the LAN-switchable packets with a public network address to make the packets network-routable packets.

The gateway service device may provide the plurality of user devices 1a–1f access to the communication network 4 and keep track of usage information for each user device 1a–1f In an embodiment of the present invention, the gateway service device 2 may allocate private network addresses for use in communication with the communication network 4 for each user device 1a–1f, e.g., act as a Dynamic Host Configuration Parameter (DHCP) server. This may allow hosts or other nodes on the communication network 4 to transmit data to user devices 1a–1f In embodiments of the present invention, the gateway service device 2 may assist in providing authentication to user devices 1a–1f with prepaid Internet access accounts by assisting the user devices 1a–1f in communicating with an ISP authentication server. Alternatively, the gateway service provider may assist in providing credit-card verification information if the user of the user device 1a–1f is utilizing a credit card to pay for access.

In one embodiment of the invention, the gateway service device 2 may be configured to allocate private network addresses to user devices 1a–1f desiring to access the communication network 4. In such an embodiment, the user device 1a–1f may determine the availability of network addresses by sending a message on the virtual distributed LAN requesting availability of network addresses. The user device's 1a–1f request may be transferred through the network as described above (user device 1a–1f=>RAD 3a–3c=> Communication network 4 =>CAD 5 => gateway service device 2). The gateway service device 2 may accept the request and provide the network address to the user device 1a–1f by sending the network address in a data message, e.g., LAN-switchable packets, back to the user device 1a–1f along the same path in the opposite direction (gateway service device 2 =>CAD 5 => Communication Network 4 =>RAD 3a–3c => user device 1a–1f . Because DHCP is a broadcast protocol, the gateway service device 2 may send offers out to all known remote access devices 3a–3c, and thus, all user devices 1a–1f. Only the user device 1a–1f that initiated the request, however, may respond. The user device 1a–1f may receive the offer from the gateway service device 2 and request the private network address to initiate the acceptance process. The gateway service device 2 may respond by acknowledging that the user device 1a–1f has accepted the offer of the private network address.

In another embodiment of the present invention, the gateway service device 2 may deliver broadband services to user devices 1a–1f in multiple retail establishments. The gateway service device 2 may establish a connection for the user device 1a–1f through an Internet Service Provider (ISP). The ISP may set specific policies for each user device 1a–1f. Alternatively, the ISP may set specific policies for each port or each building. These policies may include multiple access methods (Ethernet, wireless, DSL, cable); multiple authentication methods (port based, RADIUS, pre-paid accounts); multiple payment methods (charge to property mgmt system, credit card, RADIUS, access codes); multiple portal options (forced portal, walled-garden, free access, custom connect screens); and multiple bandwidth options.

The gateway service device 2 may only allow authorized packets to transit from the internal to the external network. The gateway service device may determine whether the user device 1a–1f is authorized to connect to the communication network 4, e.g., whether they have paid for such access. In embodiments of the invention, the user device 1a–1f may need to enter user name and password. If a user device 1a–1f is not authorized to access the communication network 4 via the gateway service device 2, the gateway service device 2 may restrict the user device 1a–1f to accessing local content or portal pages provided by the gateway service device 2. The gateway service device 2 may provide opportunities via its local content or portal pages to pay for the requested access. For example, authorization may be in the form of requesting a coupon code, credit card number, or a hotel room to bill the access charges. Depending upon the business model, the above-mentioned modes may be combined in any manner. In some embodiments of the invention, no cost may be associated with access because an advertiser may have paid for user devices 1a–1f to access the Internet in exchange for an advertisement being placed in any web page which the user device's 1a–1f web browser loads.

In embodiments of the invention, the gateway service device 2 may also interact with components on the external communication network 4. These components may include a server for real-time processing of credit-card payments or RADIUS servers for authenticating user devices 1a–1f with subscription or prepaid service agreements.

For example, in an embodiment of the invention where the gateway service device 2 interacts with an external credit-card system for real-time processing of credit card numbers, the user device 1a–1f may initiate communication with the gateway service device 2 in the manner described previously. The user device 1a–1f may be assigned a private network address utilizing the DHCP protocol and, thus, is ready for Internet access but is not allowed to access the communication network until it has been authenticated. The user device 1a–1f may open its web browser and request a home page using hypertext transfer protocol (HTTP). The gateway service device 2 may determine that the user device 1a–1f is not authorized to use the gateway service device 2 for connection to the communication network 4 and may direct the user device 1a–1f to a web page that requests an authorization code or credit card number via an input form. The user of the user device 1a–1f may fill in the input form presented in the web page and submit the input form for processing.

The gateway service device 2 may determine the user device 1a–1f is utilizing a credit cart for authorization and may contact a pre-determined credit card service for authorization over a secure channel. The credit card service may authorize the charge for the credit card number provided and may pass the authorization to the gateway service device 2. The gateway service device 2 may receive the credit card authorization and enable the user device 1a–1f for communication with the communication network 4 by initiating network address translation. The user device 1a–1f may receive the originally requested home page, which resides on a server on the communication network 4.

Because data messages travel back to the plurality of user devices 1a–1f, a reverse path may be formed. In a similar fashion to the previous discussion of the data message transmission from the plurality of user devices 1a–1f to the gateway service device 2, a data message, e.g., LAN-switchable packets from the gateway service device 2, may be encapsulated by the CAD 5 and unencapsulated by the receiving RAD 3a–3c before being relayed to the user device 1a–1f.

In embodiments of the present invention, network-routable packets are passed back to the gateway service device 2 from the communication network 4. The gateway service device 2 may initiate a reverse procedure to network address translation by replacing the public network address of the network-routable packets with the private network address of the user device 1a–1f which initiated the data message. The gateway service device 2 transmits the LAN-switchable packets from the gateway service device 2 to the local area network on which the CAD 5 and the gateway service device 2 may be located.

The CAD 5 receives the LAN-switchable packets designated for a specific user device 1a–1f The lookup table module 201 may access the lookup table to determine the network address for the RAD 3a–3c which corresponds to the user device MAC or LAN address identified as the recipient in the LAN-switchable packets. After the RAD's network address has been determined, the LAN-switchable packets may be encapsulated with a network-routing header to become network-routable packets. The network-routable packets are transmitted from the CAD 5 through the communication network 4 to the identified RAD 3a–3c. The RAD 3a–3c may unencapsulate the network-routing header, leaving the LAN-switchable packets which were transmitted to the CAD 5 by the gateway service device 2. The RAD 3a–3c may transmit the LAN-switchable packets to the user device 1a–1f identified in the LAN address of the LAN-switchable packets.

Figure 3:
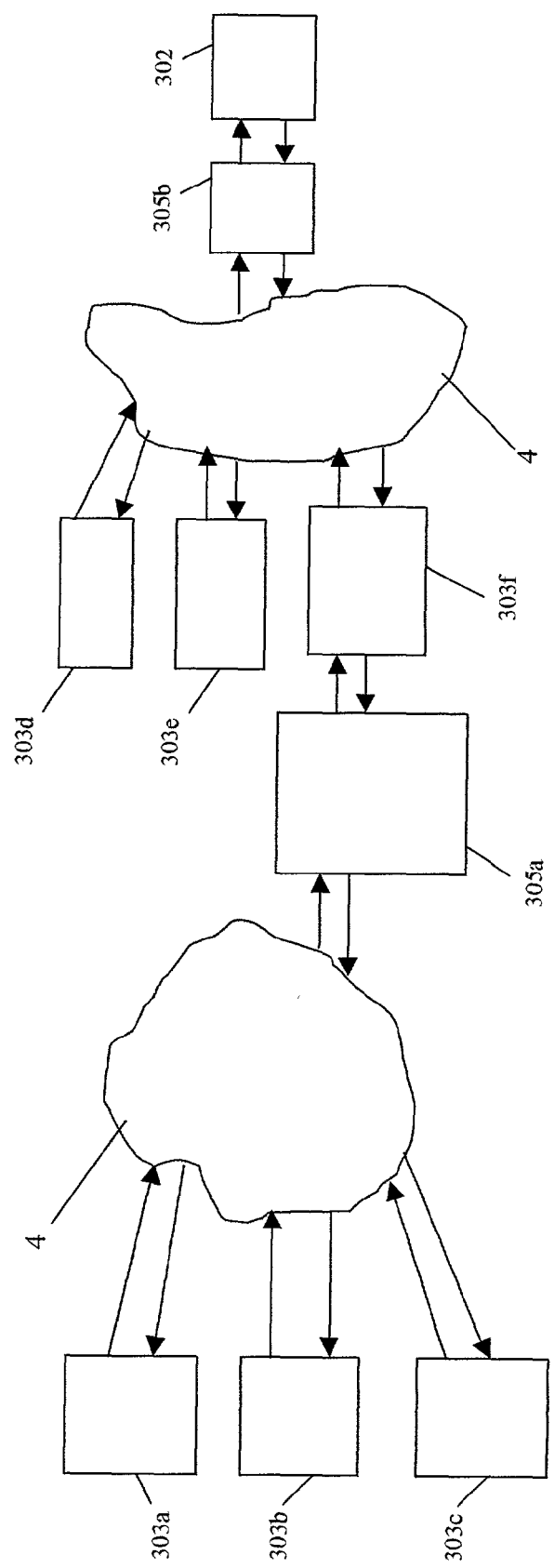
FIG. 3 illustrates a distributed virtual local area network including multiple central access devices according to an embodiment of the present invention.

FIG. 3 illustrates a distributed virtual local area network including multiple central access devices according to an embodiment of the present invention. Such an embodiment may be highly scaleable to service a large number of RAD 303a–303f sites. Because the link between the CAD 305b and the gateway service device 302 may be of much higher capacity than the link between the RAD 303a–303c and the CAD 305a through the communication network 304, the distributed virtual LAN may include multiple central access devices 305a–305b to enable a larger capacity of data to flow to the gateway service device 302. In the embodiment illustrated in FIG. 3, central access device 305a may transmit LAN-switchable packets to remote access device 303f. Remote access device 303f may encapsulate the LAN-switchable packets to generate network-routable packets and may utilize the communication network 304 as a relay device to transport the network-routable packets to a second central access device 305b. The second central access device 305b may exist on the same network segment as the gateway service device 302.

While the description above refers to particular embodiments of the present invention, it will be understood that many modifications may be made without departing from the spirit thereof. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes that come within the meaning and range of equivalency of the claims are intended to be embraced therein.

What is claimed is:

1. A central access device to enable transmission of data between at least one user device and a gateway service device via a communication network and at least one remote access device, said central access device comprising:
   a first module configured to receive from said communication network a packet including said data, a first address associated with said user device, and a second address associated with said at least one remote access device, to remove said second address from said packet, and to transmit said data and said first address to said gateway service device; and
   a second module configured to identify said first address and said second address, and to store said first address and said second address in a memory such that said first address corresponds to said second address.

2. The central access device according to claim 1, wherein said at least one user device communicates said data and said first address to said at least one remote access device.

3. The central access device according to claim 1, wherein said first address is of a type suitable for identifying a device coupled to a switched communication network.

4. The central access device according to claim 1, wherein said second address is a network-routing address.

5. The central access device according to claim 1, wherein said packet indicates that said at least one user device is the source of said data.

6. The central access device according to claim 1, wherein said packet indicates that said at least one remote access device transmitted said packet to said central access device via said communication network.

7. The central access device according to claim 1, wherein said packet further includes a third address associated with said gateway service device.

8. The central access device according to claim 7, wherein said packet indicates that said gateway service device is the intended recipient of said data.

9. The central access device according to claim 1, wherein said packet further includes a third address associated with said central access device.

10. The central access device according to claim 9, wherein said third address indicates that said central access device is the intended recipient of said packet.

11. The central access device according to claim 1, further including a third module configured to assign a logical port to said at least one user device and to inform said gateway service device of said logical port assigned to said at least one user device.

12. The central access device according to claim 11, wherein said logical port assigned to said at least one user device is selected from among a plurality of available logical ports.

13. The central access device according to claim 11, wherein said logical port is selected based on said second address.

14. The central access device according to claim 11, wherein said logical port is dynamically assigned to said at least one user device.

15. The central access device according to claim 11, wherein said at least one user device is associated with a public network address that includes said logical port assigned to said at least one user device.

16. The central access device according to claim 15, wherein said public network address is associated with said at least one user device by said gateway service device.

17. The central access device according to claim 15, wherein said public network address includes of a second public network address associated with said gateway service device.

18. The central access device according to claim 1, wherein said at least one user device is associated with a unique private network address.

19. The central access device according to claim 1, wherein said first address is an Ethernet MAC address.

20. The central access device according to claim 1, wherein said packet is an IP packets and said second address is an IP address.

21. The central access device according to claim 1, wherein said data is encapsulated within a frame containing said first address.

22. The central access device according to claim 1, wherein said packet includes a header containing said second address that precedes said first address and said data.

23. The central access device according to claim 1, further including a second memory storing information related to the time at which said central access device received said packet.

24. A central access device according to claim 1, wherein a plurality of user devices communicate data to said at least one remote access device.

25. The central access device according to claim 24, a third module configured to uniquely assign a logical port to each of said plurality of user devices and to inform said gateway service device of the unique logical port assigned to one of said plurality of user devices.

26. The central access device according to claim 1, wherein a plurality of data are communicated between said at least one user device and said gateway service device, said central access device further including a second memory storing information related to the time at which said client access device last received a packet indicating that said at least one user device was the sender of said data message.

27. A central access device according to claim 1, wherein said at least one user device communicates data to a plurality of remote access devices.

28. A central access device to enable transmission of data between at least one user device and a gateway service device via a communication network and a remote access device, said central access device comprising:
   a first module configured to receive from said gateway service device said data and a first address associated with said at least one user device, and to transmit to said communication network a packet including said data, said first address, and a second address associated with said remote access device; and
   a second module configured to identify said first address, and to retrieve said second address from a memory in which said first address is correlated to said second address.

29. The central access device according to claim 28, wherein said at least one user device communicates said data and said first address to said at least one remote access device.

30. The central access device according to claim 28, wherein said first address is of a type suitable for identifying a device coupled to a switched communication network.

31. The central access device according to claim 28, wherein said second address is a network-routing address.

32. The central access device according to claim 28, wherein said packet indicates that said at least one user device is the intended recipient of said data.

33. The central access device according to claim 28, wherein said packet indicates that said packet is to be transmitted to said at least one remote access device by said central access device via said communication network.

34. The central access device according to claim 28, wherein said packet further includes a third address associated with said gateway service device.

35. The central access device according to claim 34, wherein said packet indicates that said gateway service device is the source of said data.

36. The central access device according to claim 28, wherein said packet further includes a third address associated with said central access device.

37. The central access device according to claim 36, wherein said packet indicates that said central access device is the sender of said packet over the communication network.

38. The central access device according to claim 28, further including a third module configured to assign a logical port to said at least one user device and to inform said gateway service device of said logical port assigned to said at least one user device.

39. The central access device according to claim 38, wherein said logical port assigned to said at least one user device is selected from among a plurality of available logical ports.

40. The central access device according to claim 38, wherein said logical port is selected based on said second address.

41. The central access device according to claim 38, wherein said at least one user device is associated with a public network address that includes said logical port assigned to said at least one user device.

42. The central access device according to claim 41, wherein said public network address is assocaiated with said at least one user device by said gateway service device.

43. The central access device according to claim 41, wherein said public network address includes a second public network address associated with said gateway service device.

44. The central access device according to claim 28, wherein said at least one user device is associated with a unique private network address.

45. The central access device according to claim 28, wherein said first address is an MAC address.

46. The central access device according to claim 28, wherein said packet is an IP packet and said second address is an IP address.

47. The central access device according to claim 28, wherein said data is embedded within a frame containing said first address.

48. The central access device according to claim 28, wherein said packet includes a network-routing header containing said second address that precedes said first address and said data.

49. The central access device according to claim 28, wherein said first address is associated with one of a plurality of said user devices.

50. The central access device according to claim 49, wherein each of said plurality of user devices is associated with a unique private network address.

51. A central access device for facilitating communication between a user device and a gateway service device, said central access device comprising:

a first module configured to receive from a first communication network a first packet including data generated by said user device and a user device address, to receive from a second communication network a second packet including data generated by said gateway service device and said user device address, to extract from said first packet said data and said user device address, to add to said second packet a second packet header including a remote access device address, to transmit said first packet to said gateway service device over said second communication network, and to transmit said second packet to said remote access device over said first communication network;

a memory; and a second module configured to store in said memory as corresponding said user device address and said remote access device address, wherein said data generated by said user device is transmitted to said remote access device over a third communication network.

52. The central access device according to claim 51, wherein said third communication network is a switched communication network and said user device address is a switching address.

53. The central access device according to claim 52, wherein said third communication network is a local area network and said user device address is a MAC address.

54. The central access device according to claim 53, wherein said first packet header further includes a central access device address.

55. The central access device according to claim 51, wherein said second communication network is a switched communication network and said user device address is a switching address.

56. The central access device according to claim 55, wherein said second communication network is a local area network and said gateway service device is identified on said local area network by a MAC address.

57. The central access device according to claim 51, wherein said first communication network is a routed communication network and said remote access device address is a routing address.

58. The central access device according to claim 57, wherein said first communication network is an Internet and said remote access device address is an IP address.

59. The central access device according to claim 51, wherein said first packet further includes a first packet header that includes the remote access device address.

60. The central access device according to claim 51, wherein said first packet further includes an address identifying said gateway service device on said second communication network.

61. A central access device comprising:

means for receiving data generated by one of a plurality of user devices from a routed communication network, each of said user devices communicatively connected to one of a plurality of remote access devices connected to said communication network;

means for transmitting said data to a gateway service device over a switched communication network;

means for determining from which one of said plurality of user devices said data was received;

means for determining which one of said plurality of remote access devices is communicatively connected with said one of said plurality of user devices;

means for storing information indicating which remote access device is communicatively connected to each of said plurality of user devices.

62. A central access device comprising:
  means for receiving data generated by a gateway service device;
  means for determining to which one of a plurality of user devices said data is to be transmitted;
  means for determining which one of a plurality of remote access devices is communicatively connected to said one of said plurality of user devices, each of said remote access devices and said central access device connected to a communication network; and
  means for transmitting said data to said one of said plurality of remote access devices.

63. A method for transmitting data between a user device and a gateway service device, said method comprising:
  transmitting said data and a user device address from said user device to a first access device;
  transmitting said user device address, said data and a first access device address from said first access device to a second access device via a communication network;
  transmitting said data and said user device address from said second access device to said gateway service device; and
  by said second access device, storing as corresponding said user device address and said first access device address.

64. The method according to claim 63, further including, by said user device, encapsulating said data within a frame including said user device address.

65. The method according to claim 63, wherein said data is sent to said first access device via a first switched communication network.

66. The method according to claim 65, wherein said first switched communication network is a local area network and said user device address is a MAC address.

67. The method according to claim 63, further including, by said first access device, forming a packet including a header that precedes said frame and said data, said header including said first access device address.

68. The method according to claim 67, further including, by said second access device, removing said header from said packet.

69. The method according to claim 63, further including assigning a logical port to said user device.

70. The method according to claim 69, wherein said logical port is assigned to said user device by said second access device, and further including, by said second access device, informing said gateway service device of said logical port assigned to said user device.

71. The method according to claim 69, wherein said user device is assigned a private network address, and further including translating said private network address with a public network address including said logical port assigned with said user device.

72. The method according to claim 71, further including, by said gateway service device, generating said public network address by combining said logical port with a second public network address associated with said gateway service device.

73. The method according to claim 63, further including storing information related to the time at which said second access device received said data.

74. The method according to claim 73, further including determining whether a user device session should be terminated based on whether a timeout period has expired since said data was received by said second access device.

75. The method according to claim 63, further including, by said gateway service device, providing a gateway service, wherein said gateway service is at least one of authenticating a user password, verifying user credit card information, serving gateway content, determining whether a user device session should be terminated, and maintaining billing information associated with said user device.

76. The method according to claim 63, further including informing said first access device of a second access device address, wherein said second access device address is transmitted to said second access device with said data, said user device address and said first access device address.

77. The method according to claim 76, wherein said first access device is informed of said second access device address upon installation.

78. The method according to claim 76, informing said first access device of said second access device address including, by said second access device, sending a message including said second network address to said first access device.

79. The method according to claim 78, wherein said message is sent periodically.

80. The method according to claim 63, wherein said user device transmits a gateway service device address to said first access device with said data and said user device address.

81. The method according to claim 80, further including informing said user device of said gateway service device address.

82. The method according to claim 81, wherein said user device is informed of said gateway service device address by said first access device.

83. The method according to claim 63, wherein said user device transmits a recipient address to said first access device with said data and said by said user device address, and said method further including, by said first access device, determining whether said gateway service device is identified as the intended recipient of said data based on said recipient address.

84. The method of claim 63, further including, by said user device, embedding said data in a frame including said user device address.

85. The method according to claim 84, wherein said user device address is a MAC address.

86. The method according to claim 63, further including, by said first access device, generating a header containing said first access device address to precede said data and said user device address.

87. The method according to claim 86, wherein said header is an IP header and said first access device address is an IP address.

88. A method for transmitting data between a user device and a gateway service device, said method comprising:
  transmitting data and a user device address from said gateway service device to a second access device;
  by said second access device, retrieving from a memory a first access device address corresponding to said user device address, said first access device address identifying a first access device communicatively connected to said user device;
  transmitting said data and said user device address from said second access device to said first access device via a communication network; and
  transmitting said data from said first access device to said user device.

89. The method according to claim 88, wherein said user device is associated with a private network address, and further including translating said private network address into a public network address including said logical port assigned to said user device.

90. The method according to claim 89, further including, by said gateway service device, receiving said data and said public network address associated with said user device from a second communication network, and further including, by said gateway service device, translating said public network address to yield said private network address associated with said user device.

91. The method according to claim 88, further including assigning a logical port to said user device.

92. The method according to claim 91, wherein said logical port is assigned to said user device by said second access device, and further including, by said second access device, informing said gateway service device of said logical port assigned to said user device.

93. The method according to claim 90, further including, by said gateway service device, generating a public network address associated with said user device by combining said logical port with a second public network address associated with said gateway service device, and associating said public network address with said user device.

94. A system for transmitting data, said system comprising:
a plurality of user devices, each associated with a user device address;
a plurality of remote access devices each associated with a RAD address, wherein each of said plurality of user devices is configured to send said data and said user device address to at least one of said plurality of remote access devices;
a central access device configured to receive from at least one of said plurality of remote access devices said data, said user device address associated a sending one of said plurality of user devices, and said associated RAD address; and
a gateway service device configured to receive from said central access device said data and said user device address associated with said sending one of said plurality of user devices, wherein
said central access device includes a memory storing a correspondence between each user device address and a RAD address associated with the at least one of said plurality of remote access devices is communicatively connected.

95. The system according to claim 94, wherein said central access device and said plurality of remote access devices are communicatively connected by a communication network.

96. The system according to claim 95, wherein said gateway service device is communicatively connected to said communication network.

97. The system according to claim 95, wherein said communication network is the Internet.

98. The system according to claim 94, wherein each of said plurality of remote access devices is communicatively connected to at least one of said user devices by a switched communication network.

99. The system according to claim 98, wherein said switched network in a local area network and each of said user device addresses is a MAC address.

100. The system according to claim 98, wherein a wireless communication link is established between one of said plurality of user devices and one of said plurality of remote access devices.

101. The system according to claim 94, wherein said gateway service device and said central access device are communicatively connected by a switched communication network.

102. The system according to claim 101, wherein said switched communication network is a local area network.

103. The system according to claim 94, wherein said central access device includes a first module configured to remove said network-routing header from a received network-routable packet to leave said LAN-switchable packet, and further configured to add said network-routing header to a received LAN-switchable packet to produce said network-routable packet.

104. A system for transmitting data, said system comprising:
a gateway service device communicatively connected to said communication network;
a plurality of user devices, each of which has a unique user device address;
a plurality of remote access devices, each of which has a unique RAD address, each of said user devices communicatively connected to at least one of said plurality of remote access devices; and
a central access device having a memory storing information indicating to which remote access device each of said user devices is communicatively connected, wherein
said gateway service device receives from said communication network said data, for which one of said plurality of user devices is the intended recipient,
said gateway service device sends said data to said central access device,
said central access device retrieves from said memory the identity of the one of said plurality of remote access devices communicatively connected with said intended recipient and transmits said data to said identified remote access device, and
said identified remote access device transmits said data to said intended recipient.

105. A method for providing a gateway service to a user device, said method comprising:
establishing a communication link between said user device and a remote access device, said remote access device communicatively connected to a central access device and said central access device communicatively connected to a gateway service device;
establishing a communication session between said user device and a third party communicatively connected with said gateway service device through a communication network;
by said central access device, storing information indicating that said user device is communicatively connected to said remote access device;
by said gateway service device, providing said gateway service during said communication session, providing said gateway service including receiving data from said third party and communicating said data to said user device via said central access device and said remote access device.

106. The method of claim 105, further including at least one of authenticating a user password, verifying user credit card information, serving gateway content, determining whether a client session involving said user device should be terminated, and maintaining billing information associated with a user device.

* * * * *